(No Model.)  2 Sheets—Sheet 1.

C. G. CURTIS.
ELECTRIC MOTOR OR DYNAMO ELECTRIC MACHINE.

No. 455,898.  Patented July 14, 1891.

Witnesses
Geo. W. Breck.
Edward Thorpe

Inventor
Chas. G. Curtis (No Model.) 2 Sheets—Sheet 2.

C. G. CURTIS.
ELECTRIC MOTOR OR DYNAMO ELECTRIC MACHINE.

No. 455,898. Patented July 14, 1891.

Witnesses
Geo. W. Breck.
Edward Thorpe.

Inventor
Chas. G. Curtis

UNITED STATES PATENT OFFICE.

CHARLES G. CURTIS, OF NEW YORK, N. Y.

ELECTRIC MOTOR OR DYNAMO-ELECTRIC MACHINE.

SPECIFICATION forming part of Letters Patent No. 455,898, dated July 14, 1891.

Application filed March 9, 1891. Serial No. 384,329. (No model.)

*To all whom it may concern:*

Be it known that I, CHARLES G. CURTIS, of the city, county, and State of New York, have invented certain new and useful Improvements in Electric Motors and Dynamo-Electric Machines, of which the following is a specification.

One of the objects of my invention is to construct a form of field magnet or magnets for multipolar machines especially applicable to electric motors placed under street-cars, which shall occupy the least possible space in its vertical dimension—in fact, but little more space than the diameter of its armature—which can be easily and inexpensively made, and which shall be mechanically strong and rigid and magnetically well designed.

Another object of my invention is to provide a form of field-magnet coil or winding applicable to any form of machines, in which the wire shall not be liable to mechanical injury and frequent destruction by oil, moisture, or water, as heretofore, but shall be fully protected from mechanical injury, and at the same time shall be oil and water tight, so that these coils or spools may be subjected to the most severe conditions of use—such as in street-car service—without danger of injury.

Figure 1:
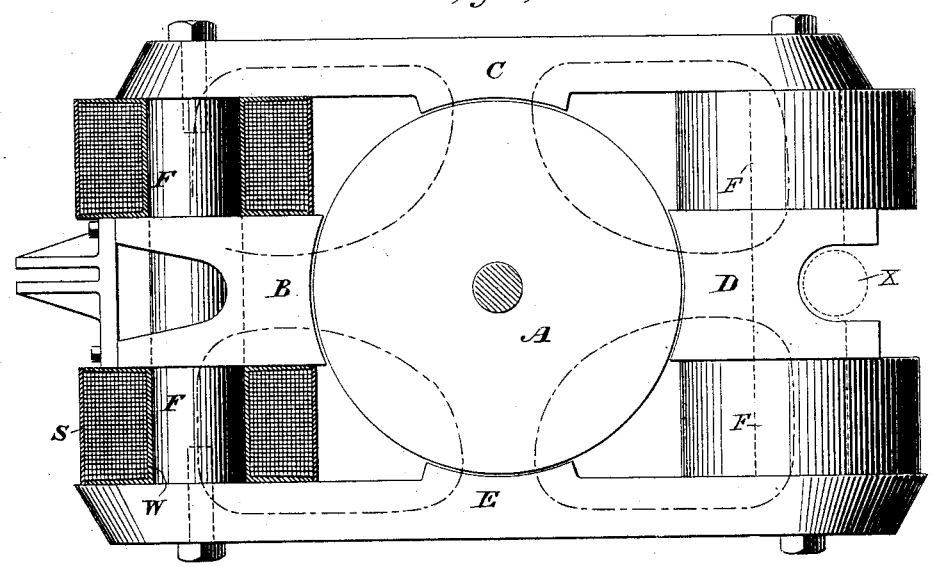
Figure 2:
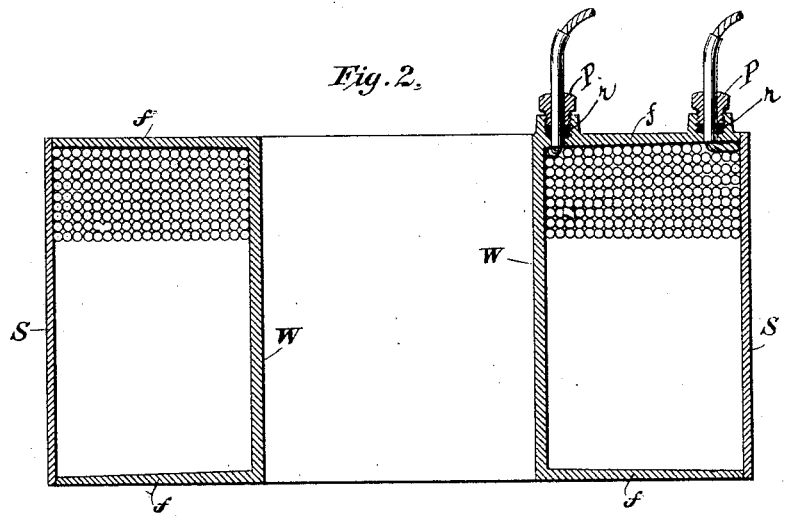
Figure 3:
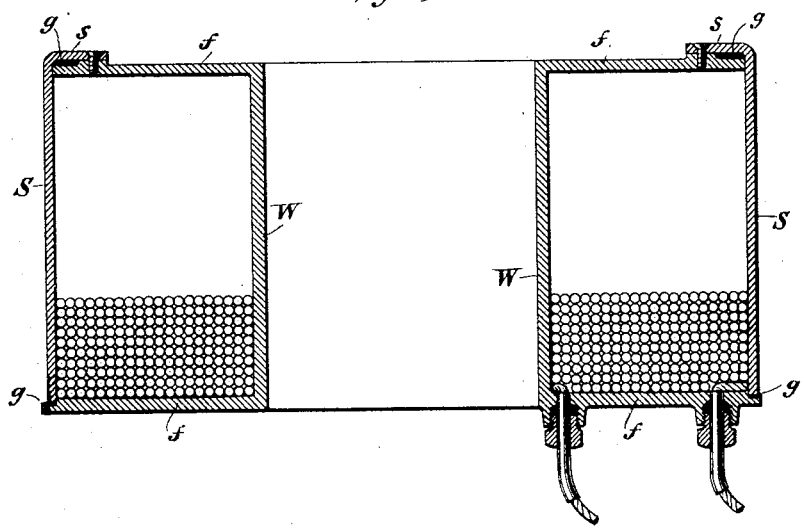

In the accompanying drawings, Figure 1 is a side view of a four-pole machine, showing the field-magnet constructed according to my invention. Fig. 2 is a sectional view of my improved field-magnet coil or spool. Fig. 3 is a modified form of the latter.

In Fig. 1, A represents the armature, and B C D E the field magnet or magnets, of a four-pole electric motor or dynamo-machine constructed according to my invention. One of the important objects of my improved field magnet or magnets is to enable an armature to be employed the diameter of which is as great as possible compared with the space occupied by the machine in one of its dimensions. In the case of street-car motors the space or distance between the floor of the car-body and the track is very limited, and it is very desirable that the space taken up by the motor in this direction should be as small as possible—in fact, not much greater than the diameter of the armature. To accomplish this I construct my improved field magnet or magnets as shown in the drawings. B and D constitute two of the pole-pieces of the machine diametrically opposite and standing in a horizontal position. These are simply blocks or masses of iron having faces of the desired form presented to the armature, and may be made of cast-iron or mitis metal, or of iron forgings, if preferred. They are connected with the other portions C and E by cores or portions F F, which may be made of wrought-iron or of mitis metal or cast-iron, and which, if desirable, may be forged or cast integral with the pole-pieces B and D. In the drawings I have shown the cores F F as made in the form of cylindrical studs or bars all in one piece, these being slipped through the pole-pieces previously bored out to receive them, the pole-pieces, if desirable, being shrunk upon the cores. The ends of the cores F F are planed or faced off, so as to fit against the connecting strips or bars C E, to which they are strongly bolted, as clearly shown. These strips C and E may be made of cast-iron, if preferred, but preferably are cut from bars of rolled wrought-iron of the proper cross-section. These bars may be made quite thin and of a width equal to the armature length, and the total cross-sectional area of each need only be sufficient to equal in magnetic capacity that of the cores F F, as will be understood from an examination of the magnetic circuits, as indicated by the dotted lines. The polar faces upon the bars C and E may be formed by building up said bars at these points by forgings or by attaching pieces of iron, or else the polar faces may be formed by employing a larger armature and simply boring out the armature-space by cutting into the bars C and E sufficiently to form polar faces having the desired area. The field-coils which I employ consist of four separate coils exactly alike, which I prefer to make in a circular form, and they are slipped over the ends of the cores F F, as clearly shown in the drawings. The bars C and E in this construction need only be long enough to reach from one core F to the other, but may be made longer, if desirable, to protect the field-spools from mechanical injury, as I have shown, for example, in the case of the bottom bar E, the object of making this bar longer being to protect the lower spools from injury by striking any obstruction on the track. This construction of field-magnet is not only very simple and readily made, but is magnetically well designed, the magnetic circuits being extremely short, and it is also mechanically a very strong structure, the wrought-iron bars C and E acting as the upper and lower flanges of a girder, provided the motor is supported at both ends, thus giving great strength without the use of any metal other than that necessary to carry the magnetism. This construction also enables the diameter of the armature to be increased up to the point where it is practically as great as the height or vertical dimension of the machine, it being only necessary to have the thickness of the iron bars C and E sufficient at the center of the pole-pieces to give the necessary strength mechanically. Another advantage of this construction is that it enables the armature-shaft and the axle of the car to be brought near enough together to enable a single gear to be employed, the pinion upon the armature-shaft gearing directly with the gear on the car-axle. This I accomplish by cutting into the pole-piece D, so as to leave a space in which the axle X can revolve, which can be done without interfering with the magnetic circuits, as will be seen from the drawings.

In Fig. 2 I have shown my improved form of field-magnet coil or reel or casing in detail. Instead of winding the field-magnet wire upon a reel or spool formed or built up of a number of pieces and made in an oblong or rectangular form, according to the usual practice, I construct my reel or form of a single piece of material, and in order to enable it to be accurately and easily wound I prefer to construct it in a perfectly circular form. This shell or reel I prefer to construct by casting in one piece of some suitable metal—such as iron or brass—and then turning it true wherever necessary, the flanges $f\,f$ and the connecting-web W being thus formed in one piece. The insulated wire is then wound upon the spool in the usual way, the ends of the wire being brought out through holes in one of the flanges $f$ and being covered where they pass through the holes of the flange by rubber tubing T T, which may be made to fit the holes tightly, and thus exclude dirt and moisture or liquid of any kind. After the coil is wound I slip over the exposed part a rigid shell or tube S, which I prefer to make of metal, and which fits closely against the outer edges of the flanges $f\,f$, as clearly shown. I then take these spools and run in solder where the shell S meets the flanges $f$, so as to make an entirely water-tight joint at these points. The result is that a field-magnet coil so constructed is not only adequately protected from mechanical injury both in handling or in place upon the machine, but is actually water-proof and not liable to injury from water or oil, as is the case with the forms of field-magnet coils heretofore employed. In order to still further reduce the chances of any moisture or oil finding its way into the coil where the wires are brought out, I provide a sort of stuffing-box nipple P. This I make in the form of a plug or nut P, threaded into a portion of the flange $f$ and acting, when screwed down, to compress an elastic washer or ring $r$, of rubber or other suitable material, so as to squeeze the rubber tubing T and insure a water-tight joint. In this way it may be made practically impossible for any water or liquid of any kind to find its way into the coil.

In Fig. 3 I have shown a modified form of my improved field-magnet coil, in which, instead of soldering in place the protecting shell or tube S, I form it with a flange $s$ at one end fitting over the face of the reel-flange $f$, so that it may be drawn down to the face of the flange by screws, as shown, squeezing between them a rubber gasket $g$, so as to make a water-tight joint at these points, the other end of the shell S fitting into a shoulder formed in the flange $f$, with another rubber gasket $g$ introduced to make this joint also water-tight.

With a field-magnet coil constructed according to my invention not only is there no danger of any water, oil, or other liquid finding its way into the coil itself and destroying it and no danger of mechanical injury under such conditions as are ordinarily found in practical use, but such coils might actually stand in water or melting snow without danger of injury, and may be easily manufactured and shipped without protection.

I am aware that an electric motor has heretofore been inclosed in a water-tight casing in such manner as to protect the entire machine from moisture, dirt, &c., and I make no claim broad enough to include such a structure, my claims in this particular being directed to a sealed or inclosed field-magnet coil or coils, the casing or covering entirely inclosing the coil or coils only and not including the armature or other part or parts of the machine.

In a structure of the nature herein disclaimed the casing must be removed, or at least one portion thereof removable, in order to afford access to the armature, the commutator, and connections, while with my improvement these parts are always accessible and the field-magnet coil or coils sealed or incased permanently, and my claims in this particular are of such scope as to include any field-magnet coil or coils surrounded by a water or oil tight casing which incloses the coil or coils only, while the other parts of the machine are always accessible.

What I claim as my invention, and desire to secure by Letters Patent, is—

1. The field magnet or magnets for multipolar electric motors or dynamo-electric machines, composed of the opposite pole-pieces B and D, the straight bars or portions C E, part of which form the other pole-pieces, the connecting-cores F F F F, and the field coils or windings placed upon the cores so as to form the four magnetic circuits, said field-coils being each surrounded by a water and oil tight shell or casing, substantially as described.

2. The combination, with the pole-pieces B and D and the straight bars or portions C and E, of the cylindrical cores F F F F, connecting the bars and pole-pieces B and D together, and the cylindrical field coils or windings placed upon the cores F, said field-coils being each surrounded by a water and oil tight shell or casing, substantially as described.

3. A field-magnet for an electric motor or dynamo-electric machine, having a rigid reel or form of water-proof material, a coil of wire wound upon said reel or form, and a rigid water-proof shell or casing covering the coil, with means for making the joints between the reel or form and the shell or casing water and oil tight, substantially as described.

4. A field-magnet for an electric motor or dynamo-electric machine, having a rigid metallic reel or form, a coil of wire wound on said reel or form, and a rigid metallic shell or casing covering the coil, with means for making the joints between the reel or form and the shell or casing water and oil tight, substantially as described.

5. A field-magnet for an electric motor or dynamo-electric machine, having a rigid metallic reel or form, a coil or conductor wound thereon, and a metallic shell or casing covering the coil and united to the casing by soldered joints, whereby the coil is protected from moisture, oil, dirt, &c., substantially as described.

6. The combination, with the metal reel containing the wire or winding and composed of the cylindrical tube or web W and the flanges $f f$, formed integral therewith, of the metal shell or casing S, fitted over the outside of the reel and soldered thereto, substantially as described.

7. An electric motor or dynamo-electric machine having its field-magnet coil or coils surrounded each by a fixed water-tight casing, the armature thereof and its connections being outside said casing or casings, substantially as described.

8. An electric motor or dynamo-electric machine having an independent water-tight casing around each field-magnet coil, substantially as described.

9. An electric motor or dynamo-electric machine having its field-magnet coils each inclosed in a separate water-tight casing and its armature and connections exterior thereto, substantially as described.

10. An electric motor or a dynamo-electric machine having its field-magnet coil or coils surrounded each by an independent water-tight protecting-casing which incloses the coil or coils only, said casing or casings being provided with water-tight packing at those points where the conductors emerge from the casings, substantially as described.

CHAS. G. CURTIS.

Witnesses:
CHESTER D. U. HOBBIE,
WILLIAM M. DREGER.